(12) United States Patent
Roberts et al.

(10) Patent No.: US 6,998,046 B2
(45) Date of Patent: Feb. 14, 2006

(54) FILTER SYSTEM AND METHODS OF OPERATING THE SAME

(75) Inventors: R. Lee Roberts, Chadds Ford, PA (US); Mark Kevin Addison, Bear, DE (US)

(73) Assignee: RG Delaware, Inc., Wilmington, DE (US)

( * ) Notice: Subject to any disclaimer, the term of this patent is extended or adjusted under 35 U.S.C. 154(b) by 64 days.

(21) Appl. No.: 10/214,580

(22) Filed: Aug. 9, 2002

(65) Prior Publication Data

US 2004/0026343 A1   Feb. 12, 2004

(51) Int. Cl.
*B01D 24/18* (2006.01)

(52) U.S. Cl. ............ 210/264; 210/273; 210/279; 210/292; 210/293; 210/340; 210/341; 210/416; 210/427; 210/108; 210/472; 210/605

(58) Field of Classification Search ............ 210/715, 210/786, 793, 798, 795, 203, 264, 273–279, 210/292–293, 252, 340, 341, 416, 427, 108, 210/472, 605

See application file for complete search history.

(56) References Cited

U.S. PATENT DOCUMENTS

| | | | | |
|---|---|---|---|---|
| 3,984,326 | A | * | 10/1976 | Bendel ............... 210/264 |
| 4,308,141 | A | | 12/1981 | Clendenen |
| 4,377,485 | A | * | 3/1983 | Krofta ................ 210/704 |
| 4,515,697 | A | * | 5/1985 | Elmaleh et al. ........ 210/768 |
| 4,547,286 | A | | 10/1985 | Hsiung |
| 4,608,181 | A | * | 8/1986 | Hsiung et al. ......... 210/786 |
| 4,793,934 | A | | 12/1988 | Thompson et al. |
| 4,859,330 | A | * | 8/1989 | Pauwels .............. 210/264 |
| 4,957,631 | A | * | 9/1990 | Pauwels .............. 210/264 |
| 4,988,439 | A | * | 1/1991 | Medders, II ........... 210/264 |
| 5,080,808 | A | | 1/1992 | Kim et al. |
| 5,198,124 | A | | 3/1993 | Kim et al. |
| 5,256,299 | A | * | 10/1993 | Wang et al. ........... 210/664 |
| 5,314,630 | A | | 5/1994 | Kim et al. |
| 5,552,045 | A | | 9/1996 | Wagner |
| 6,190,548 | B1 | * | 2/2001 | Frick ................. 210/170 |
| 6,616,852 | B1 | | 9/2003 | Roberts et al. |

OTHER PUBLICATIONS

MAXIMUS™ Filter System, Roberts Water Technolgies, Inc., 2001.

(Continued)

*Primary Examiner*—Duane Smith
*Assistant Examiner*—Minh-Chau T. Pham
(74) *Attorney, Agent, or Firm*—Merek, Blackmon & Voorhees, LLC

(57) ABSTRACT

A filter system employing a modular filter and at least one high rate pre-treatment system for expeditiously and effectively filtering water. The modular filter includes a reservoir housing for containing fluid. A plurality of filter cells are disposed in the reservoir housing for filtering influent passed through the reservoir housing. Each of the plurality of filter cells has at least one layer of media. A moveable backwash assembly is provided for sequentially backwashing the plurality of filter cells. The backwashing procedure is performed on the modular filter system such that while one of the plurality of cells is being backwashed the remaining cells are filtering pre-treated influent processed by the pre-treatment system. The pre-treatment system preferably has a footprint considerably smaller than the footprint of the modular filter. Further, the pre-treatment system preferably includes at least two pre-filters such that when one of the pre-filters is being cleaned the other pre-filter is still directing treated influent to the modular filter for further processing.

25 Claims, 6 Drawing Sheets

OTHER PUBLICATIONS

PACER II® Dual Treatment Systems, Roberts Water Technologies, Inc., 1999.

ABW® Automatic Backwash Filter, Infilco Degremont, Inc., May, 1989.

* cited by examiner

FILTER SYSTEM AND METHODS OF OPERATING THE SAME

FIELD OF THE INVENTION

The present invention is directed to a filter system for filtering water and/or wastewater. More particularly, in its most preferred form, the present invention is directed to a filter system having at least one modular polishing filter and at least one high rate pre-filter for filtering water and/or wastewater.

BACKGROUND OF THE INVENTION

Modular filter systems, i.e., filter systems having a plurality of filter compartments or cells rather than a single large filter bed for a given unit, were primarily developed to reduce the size and complexity of the backwash or cleaning structure of single, large filter beds as well as obviate the need for a total system shutdown during the backwash or cleaning procedure. One such modular filter system is disclosed in U.S. Pat. No. 4,308,141 ("'141 patent") the entire contents of which are incorporated herein by reference.

The '141 patent discloses a filter system that utilizes a tank or reservoir having a transversely positioned porous plate filter element vertically spaced above the floor or bottom of the reservoir. Wall partitions are used to divide the tank into a plurality of smaller individual compartments or cells that have a common underdrain and plenum chamber. Water containing undesired suspended particulate matter is introduced into the reservoir to filter the same. Gravity causes the influent to pass through the media in each of the cells or compartments. The filtered water or effluent is drawn away by a drain or effluent discharge located beneath or in the lower portion of the filter that communicates with the common plenum.

After a period of time of operating the modular filter system of the '141 patent to filter influent, the system requires cleaning or backwashing to remove the particulate matter collected in the media contained in the individual cells. Because the cells are backwashed sequentially, the filter system never needs to be shutdown for a backwash or a filter cleaning cycle and all of the filter cells except the one being cleaned are operable continuously.

The backwash system of the '141 patent includes a hydraulically isolating backwash hood assembly and associated carriage and platform support assembly. The backwash hood assembly depends from the mobile carriage and platform assembly and is initially centered over one of the six individual cells. Subsequently, the hood assembly is lowered to form a watertight seal with a particular cell to be backwashed. A backwash pump is activated creating a negative pressure within the backwash hood. Effluent created by adjacent individual cells is drawn up from the common underdrain through the media in the cell being backwashed to expand and wash the media. The effluent used to backwash a given cell is directed to waste through the hood assembly. This procedure is subsequently performed on all the remaining individual cells.

In the commercial application of the '141 patent, the water to be filtered by the modular filter is pre-treated by an extremely large pre-treatment system. The pre-treatment system includes a static mixer, flocculation paddles, settling tubes and a settling basin. The footprint of the pre-treatment system, i.e., the square footage of floor space occupied by the pretreatment system is approximately as large if not larger than the footprint of the corresponding modular filter. As a result, the entire filter system is extremely large, expensive and time consuming to construct. Obviously, these inherent disadvantages of the presently known modular filter systems severely limit the applications in which modular filter systems can be employed to filter water or wastewater. Further, the pre-treatment systems previously used in conjunction with modular filters process water at an extremely slow rate.

OBJECTS AND SUMMARY OF THE INVENTION

An object of the preferred embodiment of the present invention is to provide a novel and unobvious filter system.

Another object of a preferred embodiment of the present invention is to provide a modular filter system that overcomes one or more disadvantages of previously known modular filter systems.

A further object of a preferred embodiment of the present invention is to provide a filter system having a modular filter and a pretreatment system that has a substantially smaller footprint than previously know systems employing a modular filter as one of the components.

Yet still another object of the present invention is to provide a filter system having a modular filter and at least one high rate pre-filter to expeditiously and effectively filter water or wastewater.

Still a further object of a preferred embodiment of the present invention is to provide a filter system that employs a modular filter and at least two high rate pre-filters such that when one of the pre-filters is being cleaned the other pre-filter is directing treated influent to the modular filter for further processing.

Another object of a preferred embodiment of the present invention is to provide a filter system having a modular filter and a pre-treatment unit that is relatively inexpensive and easy to construct.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to a filter system for filtering water or wastewater comprising at least one pre-filter for pre-treating influent. The at least one pre-filter has a single compartment for flocculating and filtering influent passing through the pre-filter. The filter system also includes at least one polishing filter for filtering influent pre-treated by the at least one pre-filter. The at least one polishing filter includes a reservoir housing for containing fluid. The reservoir housing has a plurality of filter cells for filtering influent passed through the reservoir housing. Each of the plurality of filter cells has at least one layer of media. A moveable backwash assembly is provided for sequentially backwashing the plurality of filter cells.

Another embodiment of the present invention is directed to a filter system for filtering water or wastewater comprising at least one pre-filter for pre-treating influent. The at least one pre-filter has a reservoir. The reservoir has a particulate media housed therein for removing a portion of impurities suspended in the influent. At least one polishing filter is provided for filtering influent pre-treated by the at least one pre-filter. The at least one polishing filter includes a reservoir housing for containing fluid. The reservoir housing has a plurality of filter cells for filtering influent passed through the reservoir housing. Each of the plurality of filter cells has at least one layer of media. A moveable backwash assembly is provided for sequentially backwashing the plurality of filter cells.

A further embodiment of the present invention is directed to a filter system for filtering water or wastewater comprising at least a first pre-treatment zone for pre-treating influent passing through the pre-treatment zone. The filter system further includes means for directing influent through the first pre-treatment zone at a rate of at least 5 gpm/sq. ft. At least one polishing filter is provided for filtering influent pre-treated by the first pre-treatment zone. The at least one polishing filter includes a reservoir housing for containing fluid. The reservoir housing has a plurality of filter cells for filtering influent passed through the reservoir housing. Each of the plurality of filter cells has at least one layer of media. A moveable polishing backwash assembly is provided for sequentially backwashing the plurality of filter cells of the polishing filter.

Still another embodiment of the present invention is directed to a filter system for filtering water or wastewater comprising a polishing filter for filtering pre-treated influent. The polishing filter has a footprint equal to the square footage of floor space occupied by the polishing filter. The polishing filter includes a reservoir housing for containing fluid. The reservoir housing has a plurality of filter cells for filtering pre-treated influent passed through the reservoir housing. Each of the plurality of filter cells has at least one layer of media. A moveable polishing backwash assembly is provided for sequentially backwashing the plurality of filter cells of the polishing filter. The filter system further includes a pre-treatment unit for pre-treating influent. The pre-treatment unit has an inlet for receiving untreated influent and an outlet for directing influent pre-treated by the pre-treatment unit to the polishing filter. The pre-treatment unit has a footprint equal to the square footage of floor space occupied by the pre-treatment unit. The footprint of the pre-treatment unit is substantially less than the footprint of the polishing filter.

Yet another embodiment of the present invention is directed to a method of backwashing a filter system that is used to filter water or wastewater. The method comprises the step of providing a pre-filter for pre-treating influent. The pre-filter has a single compartment for flocculating and filtering influent passing through the pre-filter. The single compartment also has a particulate media formed therein. The method includes the further step of providing a polishing filter for filtering influent pre-treated by the pre-filter. The polishing filter includes a reservoir housing having a plurality of filter cells for filtering influent passed through the reservoir housing. Each of the plurality of cells has at least one layer of media. The method includes the further steps of providing a first backwash assembly for backwashing the pre-filter and providing a second backwash assembly for backwashing the polishing filter. The method includes the further step of backwashing the pre-filter such that all of the media in the single compartment is backwashed at the same time. The method includes the further step of sequentially backwashing each cell of the polishing filter such that only media in one of the plurality of filter cells is backwashed at a given time.

Yet still another embodiment of the present invention is directed to a method of backwashing a filter system that is used to filter water or wastewater. The method includes the steps of providing first and second upflow filters for pre-treating influent and providing a polishing filter for filtering influent pre-treated by the first and second upflow filters.

The polishing filter includes a reservoir housing having a plurality of filter cells for filtering influent passed through the reservoir housing. Each of the plurality of cells has at least one layer of media. The method includes the further steps of providing a first backwash assembly for backwashing the first upflow filter and providing a second backwash assembly for backwashing the second upflow filter. The method includes the further step of providing a third backwash assembly for backwashing the polishing filtering. The method includes the additional steps of backwashing the first upflow filter while the second upflow filter is pre-treating influent, directing influent pre-treated by the second upflow filter to the polishing filter while the first upflow filter is being backwashed and backwashing one cell of the plurality of cells of the polishing filter while at least one other cell of the polishing filtering is filtering the pretreated influent generated from the second upflow filter.

DETAILED DESCRIPTION OF THE PREFERRED EMBODIMENT OF THE INVENTION

The most preferred forms of the invention will now be described with reference to FIGS. 1–6. The appended claims are not limited to the most preferred forms and no term used herein is to be given a meaning other than its ordinary meaning unless accompanied by a statement that the term "as used herein is defined as follows".

Figure 1:
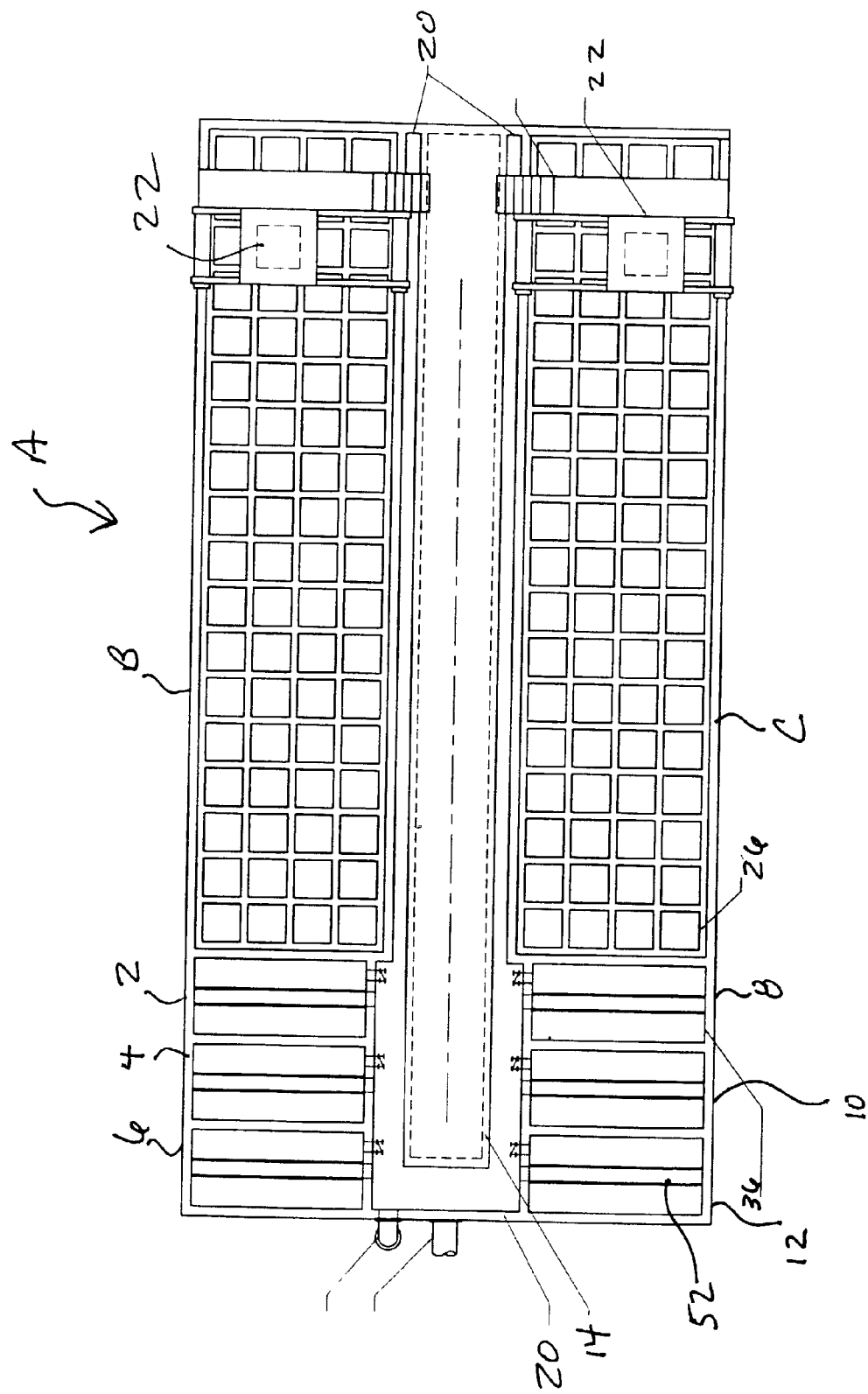
FIG. 1 is a plan view of a portion of a filter system formed in accordance with the most preferred embodiment of the present invention.
Figure 2:
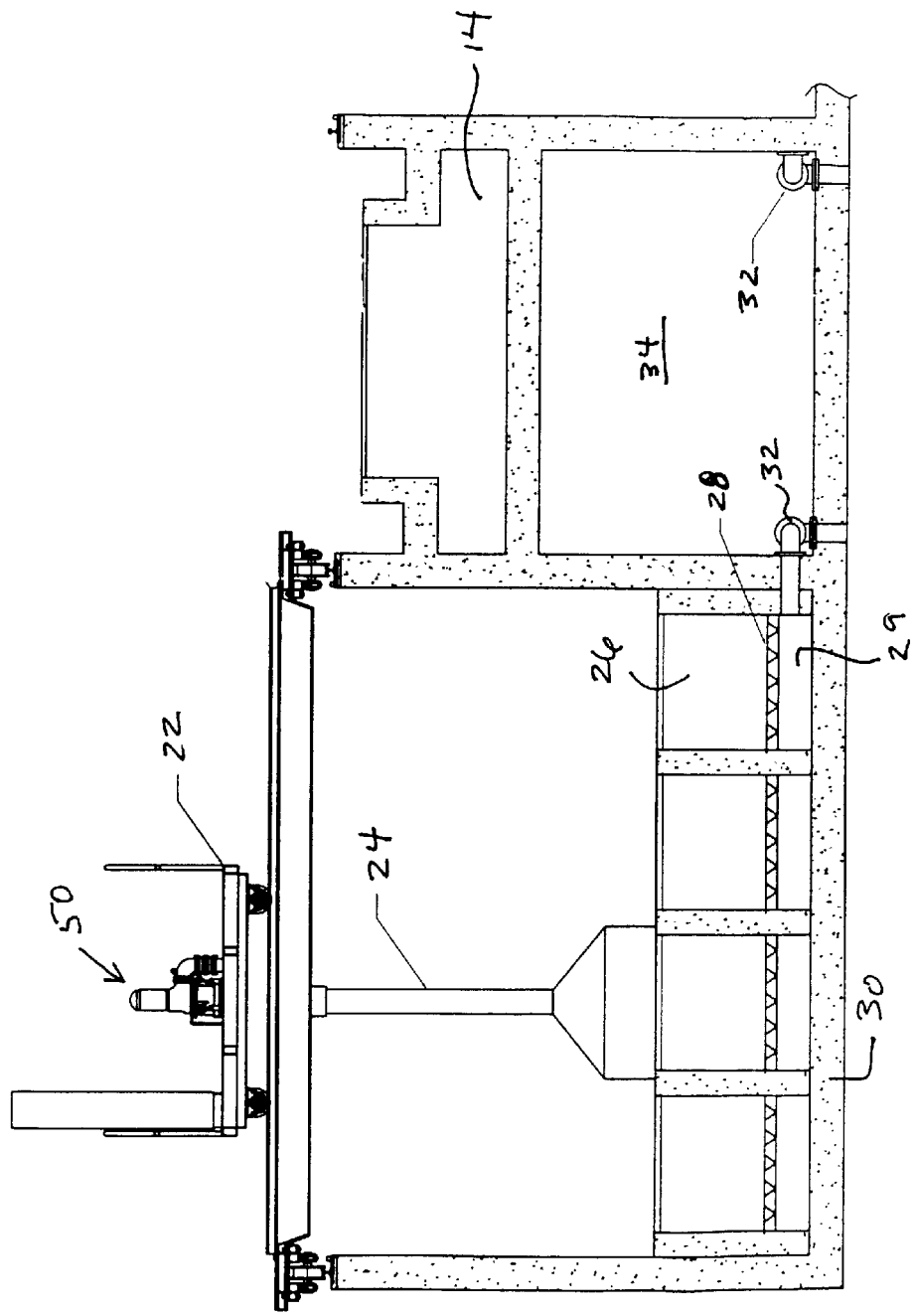
FIG. 2 is a fragmentary cross-sectional view of the filter system depicted in FIG. 1 taken through one of the modular filters and the corresponding modular filter influent channel and pipe gallery.
Figure 3:
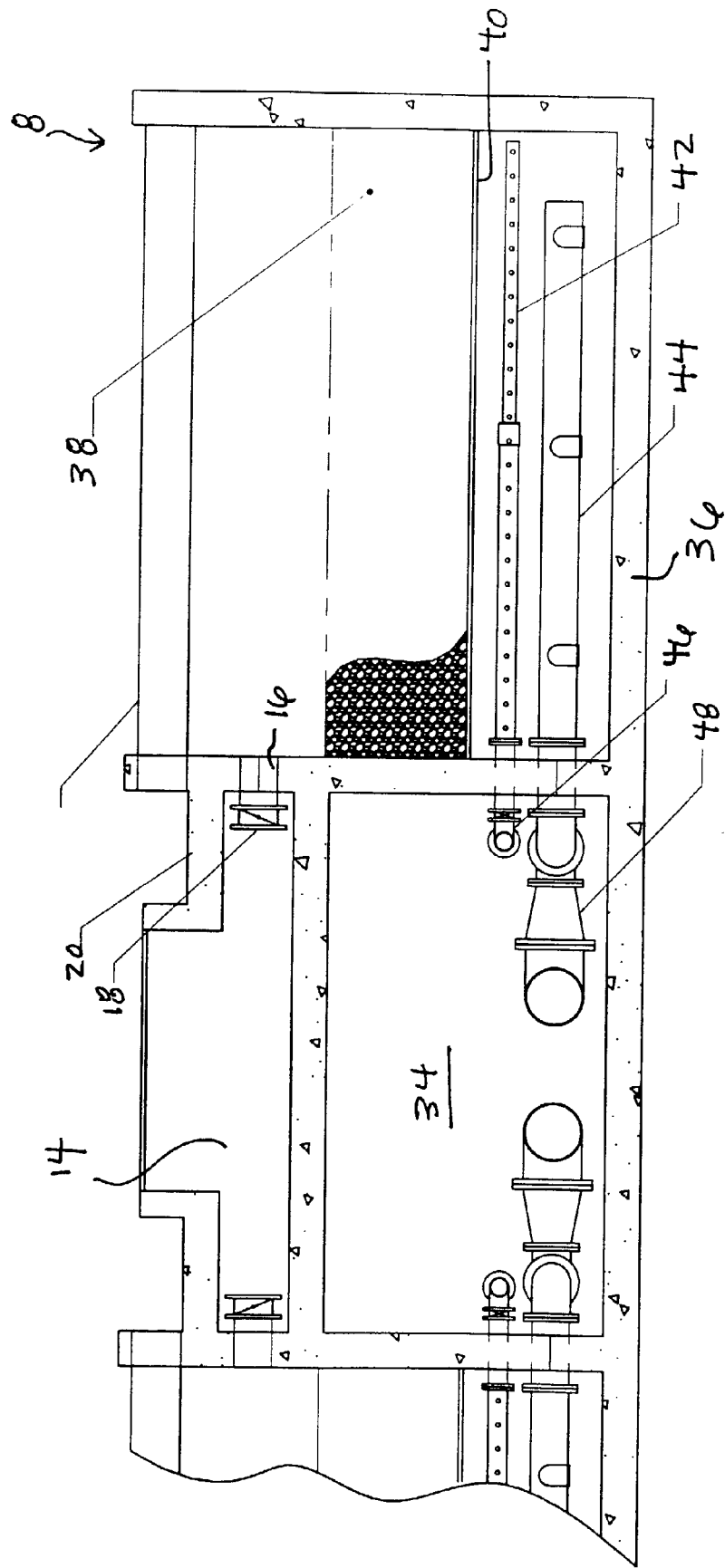
FIG. 3 is a fragmentary cross-sectional view of the filter system depicted in FIG. 1 taken through the one of the pre-filters and the corresponding modular filter influent channel and pipe gallery.

FIGS. 1 through 3

Referring to FIGS. 1 to 3, a filter system A is illustrated in one of many possible configurations. The filter system includes two modular filters B and C. It will be readily appreciated that the number of modular filters may vary and be as few as one in any given system. Adjacent modular filter B are three upflow filters 2, 4 and 6. Similarly, adjacent the modular filter C are three upflow filters 8, 10 and 12. The upflow filters 2 to 12 form the pre-treat system for the most preferred embodiment. The pre-treatment system treats the raw water prior to entry into the modular filters B and C. The term "untreated influent" as used herein is defined as follows: raw water that has not undergone any process in which a portion of the impurities suspended in the raw water have been removed. "Pre-treated influent" as used herein is defined as follows: raw water that has undergone processing that has resulted in the removal of at least a portion of the impurities suspended in the raw water.

The pre-treatment system can take many forms. For example, the pre-treatment system could include as few as one upflow filter for each modular filter. Further, the pre-treatment system could use downflow filters rather than upflow filters. Moreover, the pre-treatment system could utilize devices other than upflow and downflow filters including but not limited to tube and plate settlers. Preferably, the pre-treatment system is comprised of one or more pre-treatment units that have a footprint considerably smaller than the footprint of the modular filter. Further, it is preferable that the unit or units of the pre-treatment system process untreated influent at a high rate, i.e., influent is directed to the pre-treatment systems at a flow rate of 5 gpm/sq. ft or greater.

Referring to FIGS. 1 to 3, an influent channel 14 runs through the middle of the filter system A. The influent channel 14 directs pre-treated influent processed by the upflow filters 2 to 12 to the modular filters B and C. As seen in FIG. 3, each of the upflow filters includes a port 16 through which pre-treated influent passes after being filtered by the upflow filter. Port 16 discharges directly into the influent channel 14. A valve 18 controls the flow of pre-treated influent from the upflow filters to the influent channel 14. Each modular filter includes a plurality of ports (not shown) along its length through which the pre-treated influent flows from the influent channel 14 to the modular filters B and C. A waste channel 20 is located above the influent channel 14 and receives the wash water from the modular filters B and C and the upflow filters 2 to 12 once these filters have been backwashed or cleaned.

The most preferred form of the modular filters will now be described. Only modular filter B will be described in detail as the modular filters B and C are the same. Referring to FIGS. 1 and 2, the modular filter system B includes a mobile operations deck 22, a traveling backwash hood 24, a plurality of filter cells 26, an underdrain 28 and a reservoir tank 30. Preferably, the plurality of filter cells 26 form a bank in that each shares a common plenum as illustrated in FIG. 2 by reference numeral 29. In the most preferred form, eight filter cells 26 form a bank, i.e., all eight filter cells share a common underdrain. Further, in the most preferred form, nine banks are present in the reservoir tank 30. It will be readily appreciated that the number of cells making up a bank and the number of banks present in the reservoir tank 30 may be varied as desired. Referring to FIG. 2, effluent piping 32 is disposed in the pipe gallery 34 and is connected to a given bank of filter cells to transport effluent discharged by the modular filter B to a holding tank (not shown) at a location removed from the filter system A. Preferably, the underdrain 28 is of the type disclosed in U.S. Pat. No. 4,308,141, which includes a porous plate. However, any type of conventional underdrain can be used. Further, it will be readily appreciated that the media in any given cell 26 may include one or more gravel layers thereby obviating the need for the porous plate.

The most preferred form of the modular filter B is similar to that described in U.S. Pat. No. 4,308,141. Accordingly, further details of the modular filter will not be described.

The most preferred form of the pre-treatment units 2 to 12 will now be described. Only pretreatment filter 8 will be described in detail as all pre-treatment units 2 to 12, in the most preferred form, are the same. Referring to FIG. 3, the upflow filter 8 has a reservoir tank 36. Media 38 is disposed in the reservoir tank 36. A screen 40 supports the media 38. The media 38 may be either buoyant or non-buoyant and may be formed of any suitable material including but not limited to sand, garnet, anthracite, plastic or gravel. The media 38 may be formed in a single layer or multiple layers, i.e. more than one layer. Preferably, the media has an effective size, specific gravity and uniformity coefficient that promotes the processes of flocculation and filtration. It will be readily appreciated that flocculation need not take place in the upflow pre-filter. In the most preferred form, the media has a specific gravity greater than 1, an effective size greater than 1 millimeter and a uniformity coefficient in excess of 1.

Disposed below screen 40 is an air distributor 42 and an influent distributor 44. The air distributor 42 is connected to air piping 46 disposed in the pipe gallery 34. Air is pumped into the piping 46 at a specified flow rate during the washing process for the upflow filter 8. The influent distributor 44 is connected to influent piping 48 disposed in the pipe gallery 34. Untreated influent passes through the influent piping 48 to the influent distributor 44 both during the washing process and the filtering process. Preferably, each pre-treatment unit has its own air and influent distributor such that a given pre-treatment unit may be operated independent of the other pre-treatment units. It should be noted that nozzles may be used as opposed to the air distributor 42 and the influent distributor 44.

Operation of the Filter System Depicted in FIGS. 1 through 3

During a filtering mode, untreated influent is piped into each of the upflow filters 2 to 12 via influent piping 48 and the influent distributor 44. Prior to entry of the untreated influent into the upflow filters conventional chemicals may be added to enhance the filtration process. The influent flows upwardly through the media 38. The influent is discharged through port 16 into the influent channel 14. As the influent passes through the media 38, a substantial portion of impurities suspended in the influent are removed.

The pre-treated influent flows into influent channel 14 and is directed to the modular filters B and C. Gravity causes the influent to pass through the media present in each of the plurality of filter cells 26. The fluid is discharged through the effluent piping 32. When the filters B and C are in the filtering mode, the moveable backwash hood 24 is raised and thereby disengaged from the filter cells 26. Preferably, the hood 24 is raised and lowered in a manner similar to that disclosed in U.S. Pat. No. 4,308,141. However, it will be readily appreciated by those of ordinary skill in the art that the hood 24 may be raised and lowered by employing numerous conventional devices. Further, it will be readily appreciated that the hood 24 may be replaced with a backwash shoe similar to that disclosed in U.S. Pat. No. 5,552,045 or other known backwash shoes.

After a specified period of time of filtration, the modular filters B and C and the upflow filters 2 to 12 need to be cleaned. Preferably, the cleaning process is performed such that influent is still filtered by the filter system A even though various portions of the system are being cleaned. The preferred backwashing procedure for the modular filters B and C will now be described. The backwashing procedure is commenced by closing the effluent discharge for a given bank of cells and aligning the hood 24 with one of the plurality of filter cells 26. A microprocessor (not shown) controls all of the backwash functions and positions the hood 24 accurately over each cell to be backwashed. Once the hood 24 is positioned over the cell to be backwashed, the hood 24 is lowered such that it forms a fluid tight connection with the cell to be backwashed. Preferably, the fluid tight connection between the hood 24 and any given cell is achieved as described in U.S. Pat. No. 4,308,141. Once again, it must be kept in mind that any suitable means can be used for achieving the fluid tight connection between the hood 24 and any given cell.

Once the fluid tight connection is achieved, the backwash pump 50, as seen in FIG. 2, is turned on to induce the flow of fluid upwardly through the underdrain 28, the filter media and the hood 24. Preferably, the backwash pump is of the type described in U.S. Pat. No. 4,308,141. However, any suitable device may be used for directing the flow of fluid upwardly. Preferably, the backwash hood 24 includes a horizontal baffle plate of the type described in U.S. Pat. No. 4,308,141. This baffle plate assures a uniform expansion of the media and a balanced rate of effluent upflow through the hood. It will be understood that other devices may be used to accomplish the objectives of the baffle plates. In the most preferred form, the hood 24 includes upper and lower displacement accelerators as described in U.S. Pat. No. 4,308,141. The accelerators maintain a high flow velocity to effectively remove solids from the bed. Once again, it will be appreciated that other means may be employed to accomplish the objectives of the accelerators.

The backwash fluid used to expand and wash the media in a given cell is supplied by the surrounding cells in a given bank of cells through the common underdrain 28. The contaminated backwash fluid is discharged through conventional piping to the waste trough 20.

In the most preferred form, a jet wash pump and associated components as described in U.S. Pat. No. 4,308,141, are employed to achieve a more thorough cleaning of the filter media of any given cell. The jet pump and associated components provide a fluid scour to further cleanse the media as described in U.S. Pat. No. 4,308,141. However, it will be readily appreciated that other scour systems may be employed including an air scour system.

Once a given cell has been backwashed, the hood 24 is raised and moved to the next cell to be backwashed. This procedure is followed until all of the cells of a given bank are backwashed.

It will be readily appreciated that while a given filter cell is being backwashed the remaining filter cells are filtering treated influent. In this manner, the filter system A is not shut down or taken off line during the cleaning procedure.

The cleaning procedure for the upflow filters will now be described. Preferably, the cleaning procedure is performed in a such a manner that at least one of the upflow filters is operating at all times to filter influent. Preferably, the liquid used to clean the upflow filter is the raw water. However, clean or filtered water may be used to clean the upflow filter. For best results, a combination of liquid and air is used. Where the media is of a non-buoyant nature the procedure is preferably performed in two steps. The first step is liquid and air followed by liquid alone. Liquid is introduced into the media in the upflow filter through the influent distributor 44. Air is introduced through the air distributor 42. The velocity of the liquid is preferably less than the minimum fluidization velocity of the media in each step. Most preferably, the velocity of the influent is less than one half the minimum fluidization velocity of the media in each step.

The term minimum fluidization velocity as used herein is defined as follows: minimum fluidization velocity=$0.00381 (d)^{1.82}(sg-1)^{0.941} \rho^{1.88} \mu^{-0.88}$, where d is equal to the effective size of the media multiplied by the uniformity coefficient; sg is the specific gravity of the media; $\rho$ is the density of the water in lbs./cu. ft.; and, $\mu$ is the viscosity of the water in centipoise. If the Reynolds number based on d and the minimum fluidization velocity is greater than 10, then the following correction factor must be applied: $K=1.775Re^{-0.272}$, where Re is the Reynolds number based on d and the minimum fluidization velocity.

The rate of the air scour is preferably between approximately 1 to 9 scfm/sq. ft. Where the media is buoyant, a combination of liquid and air is used. Air is used to allow the media to descend from a retaining screen and fluidize. The wash water from the upflow filter runs into the wash trough 52 located adjacent the top of each of the upflow filters. The wash trough empties into the waste trough 20. This procedure is performed on each upflow filter until all have been cleaned. It will be readily apparent that several upflow filters can be cleaned simultaneously.

FIG. 4

Figure 4:
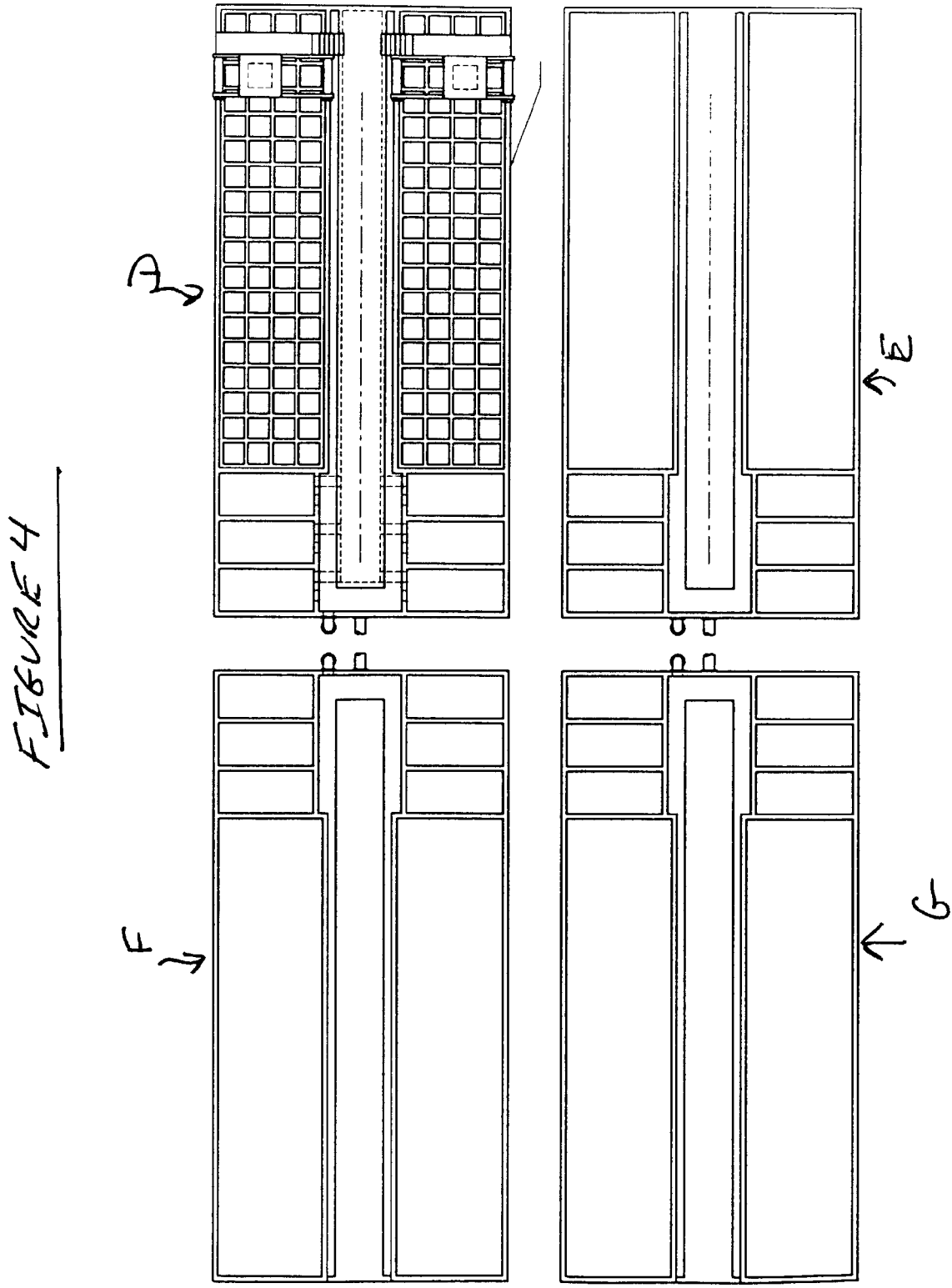
FIG. 4 is one of many possible configurations of a filter system employing the most preferred embodiment of the present invention.

FIG. 4 shows one of many possible alternative configurations for a water treatment or wastewater treatment plant. FIG. 4 depicts four filter systems D, E, F and G. Each filter system is preferably constructed in the same manner as filter system A. Each system is designed to filter 12 million gallons of liquid per day. Accordingly, the total plant can process 48 million gallons of liquid per day.

Figure 5:
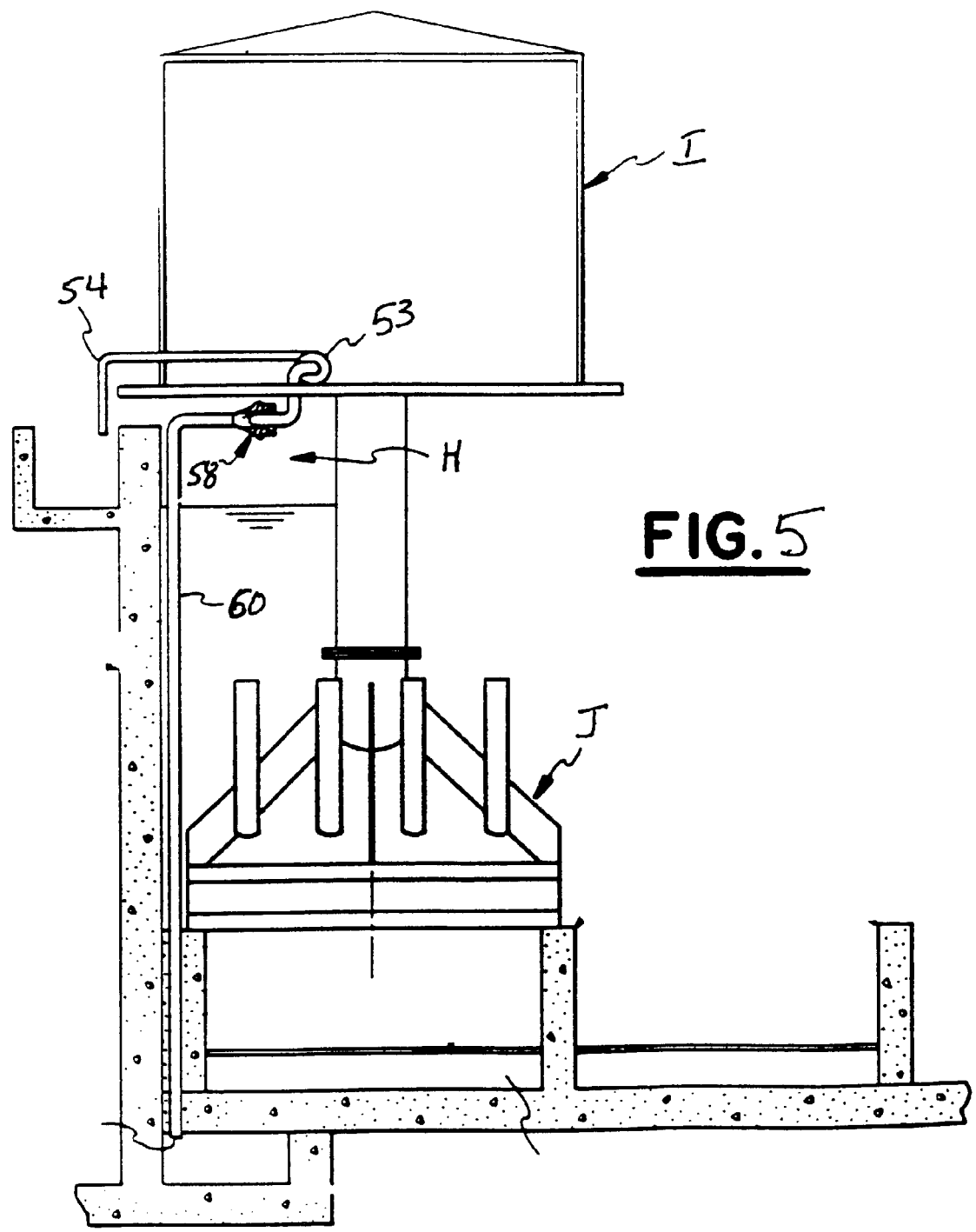
FIG. 5 is a fragmentary cross-sectional view of an alternative form of the modular filter.
Figure 6:
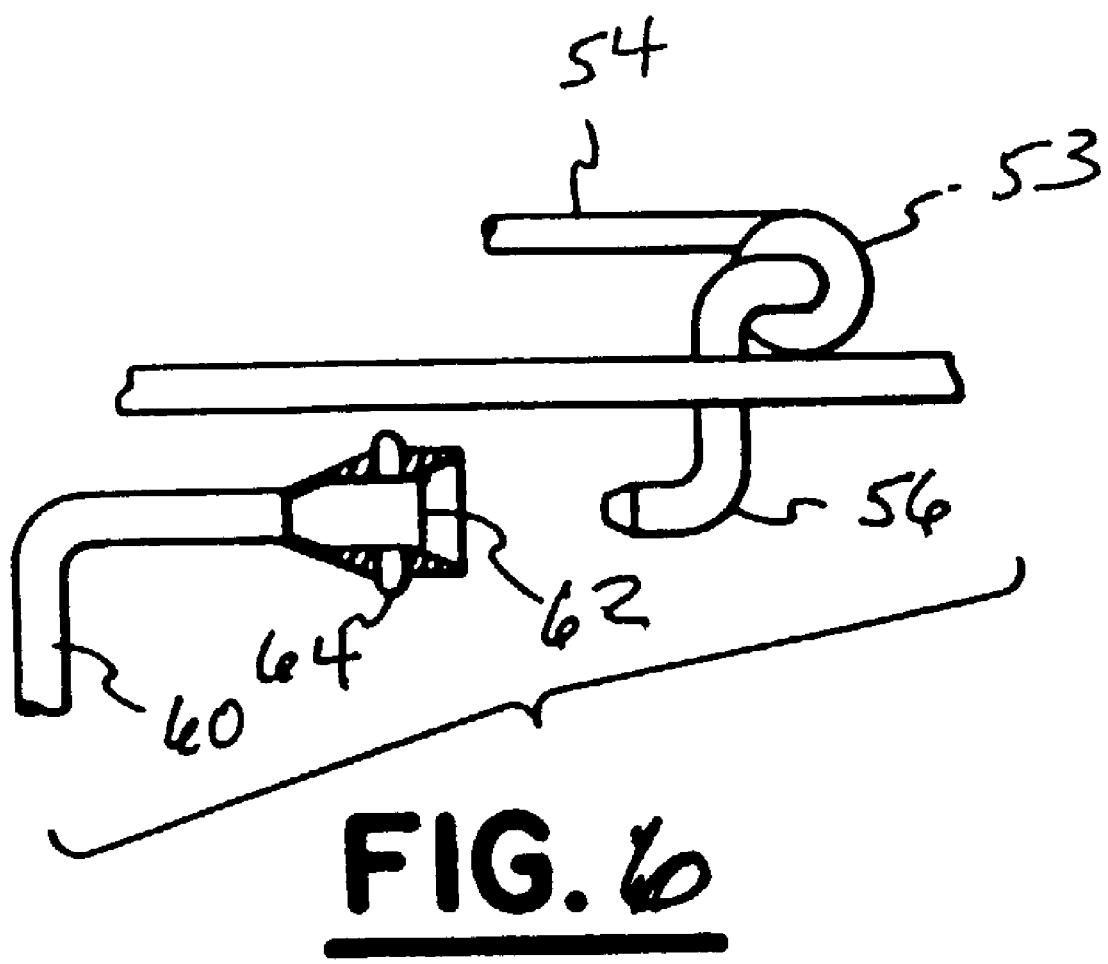
FIG. 6 is a fragmentary view of the components of a filter to waste system for the alternative form depicted in FIG. 5.

FIGS. 5 and 6

FIGS. 5 and 6 depict an optional filter to waste system H. The filter to waste system includes a filter to waste pump 53, a filter discharge conduit 54, a filter to waste probe 56, a docking station 58 and a filter to waste suction conduit 60. The docking station 58 includes a swing type check valve 62 and an expansion joint 64. The expansion joint eliminates and/or reduces the stresses caused in joining the docking station 58 with probe 56. Check valve 62 is depicted in the open position in FIG. 5 and in the closed position in FIG. 6. In the open position, fluid may pass from waste suction conduit 60 through probe 56 and out discharge conduit 54. In the closed position, the check valve 62 will prevent fluid from flowing in the manner just described.

Filter to waste pump 53, filter to waste probe 56, and filter to waste discharge conduit 54 are fixed to and moveable with the operations deck I. Filter to waste suction conduit 60 is positioned adjacent the last cell of a given bank of cells to be backwashed. Once the hood J aligns with the last cell to be backwashed of a given bank of cells, the probe 56 docks with docking station 58. The hood J is then lowered and the cell is backwashed. Once the backwash procedure is finished a filter to waste step is performed using filter to waste system H. Preferably, hood J is raised during the filter to waste step. The filter to waste step is initiated by turning on pump 53, which in turn causes fluid to flow upwardly through discharge conduit 60. This filter to waste step allows for the removal of additional particulate matter not previously removed during the backwashing procedure. The filter to waste step is preferably performed for a time interval of anywhere from 2 minutes to 15 minutes. After the filter to waste step has been performed, a bank of cells may be returned to the filtration mode or cycle by opening the effluent discharge valve.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A filter system for filtering water or wastewater, comprising:
   (a) at least one pre-filter for pre-treating influent, said at least one pre-filter having a single compartment for flocculating and filtering influent passing through said pre-filter, said single compartment having a first cross-sectional area taken along a horizontal plane extending through said single compartment;
   (b) at least one polishing filter for filtering influent pre-treated by said at least one pre-filter;
   (c) said at least one polishing filter including a reservoir housing for containing fluid, said reservoir housing having a plurality of filter cells for filtering influent passed through said reservoir housing, each of said plurality of filter cells having at least one layer of media, one of said plurality of filter cells has a second cross-sectional area taken along a horizontal plane passing through said one of said plurality of filter cells, said first cross-sectional area is greater than said second cross-sectional area; and,
   (d) a moveable backwash assembly for sequentially backwashing said plurality of filter cells.

2. A filter system as recited in claim 1, wherein:
   (a) said at least one pre-filter includes a buoyant media for flocculating and filtering influent; and
   (b) a pre-filter backwash system operably associated with said at least one pre-filter for fluidizing said buoyant media during backwashing.

3. A filter system as recited in claim 1, further including:
   (a) means for directing influent through said first pre-treatment zone at a rate of at least 5 gpm/sq.ft.

4. A filter system as recited in claim 1, wherein:
   (a) said at least one pre-filter includes a non-buoyant media for flocculating and filtering influent; and
   (b) a pre-filter backwash system operably associated with said at least one pre-filter for backwashing said at least one pre-filter, said pre-filter backwash system being designed such that influent is used to backwash said non-buoyant media.

5. A filter system as recited in claim 4, wherein:
   (a) said pre-filter backwash system during backwashing directs influent through said pre-filter at a velocity less than the minimum fluidization velocity of said non-buoyant media.

6. A filter system as recited in claim 5, wherein:
   (a) said non-buoyant media has an effective size greater than 1 millimeter.

7. A filter system as recited in claim 6, wherein:
   (a) said pre-filter has at least two layers of non-buoyant media.

8. A filter system as recited in claim 7, further including:
   (a) means for directing influent through said first pre-treatment zone at a rate of at least 8 gpm/sq.ft.

9. A filter system as recited in claim 1, wherein:
   (a) said pre-filter is an upflow filter.

10. A filter system for filtering water or wastewater, comprising:
    (a) at least one pre-filter for pre-treating influent, said at least one pre-filter having a reservoir housing and a washing assembly including air scour piping, said reservoir housing having a filter bed formed from particulate media housed therein for removing a portion of impurities suspended in the influent, at least a portion of said air scour piping being disposed below said filter bed;
    (b) at least one polishing filter for filtering influent pre-treated by said at least one pre-filter;
    (c) said at least one polishing filter including a reservoir housing for containing fluid, said reservoir housing of said polishing filter having a plurality of filter cells for filtering influent passed through said reservoir housing of said polishing filter, each of said plurality of filter cells having at least one layer of media; and,
    (d) a moveable backwash assembly for sequentially backwashing said plurality of filter cells.

11. A filter system as recited in claim 10, further including:
    (a) a filter to waste assembly for performing a filter to waste procedure on said polishing filter.

12. A filter system as recited in claim 11, further including:
    (a) a single underdrain in fluid communication with each of said plurality of filter cells such that fluid from said underdrain passes through each of said plurality of filter cells once all of the filter cells have been backwashed.

13. A filter system as recited in claim 11, wherein:
    (a) said filter to waste assembly only performs a filter to waste procedure on a last filter cell of said plurality of filter cells.

14. A filter system as recited in claim 10, wherein:
    (a) said pre-filter includes at least one layer of non-buoyant media.

15. A filter system as recited in claim 10, wherein:
    (a) said pre-filter includes at least one layer of buoyant media.

16. A filter system for filtering water or wastewater, comprising:
    (a) at least a first pre-treatment zone for pre-treating influent passing through said pre-treatment zone;
    (b) influent piping for directing influent to said first pre-treatment zone;
    (c) at least one polishing filter for filtering influent pre-treated by said first pre-treatment zone;
    (d) said at least one polishing filter including a reservoir housing for containing fluid, said reservoir housing having a plurality of filter cells for filtering influent passed through said reservoir housing, each of said plurality of filter cells having at least one layer of media;
    (e) a moveable polishing backwash assembly for sequentially backwashing said plurality of filter cells of said polishing filter;
    (f) effluent piping for directing effluent away from said polishing filter; and,
    (g) a pipe gallery extending along said first pre-treatment zone and said polishing filter, at least a portion of said influent Piping and at least a portion of said effluent Piping being disposed in said pipe gallery.

17. A filter system as recited in claim 16, wherein:
    (a) said at least one pre-filter includes a non-buoyant media for flocculating and filtering influent; and
    (b) a pre-filter backwash system operably associated with said at least one pre-filter for backwashing said at least one pre-filter, said pre-filter backwash system being designed such that influent is used to backwash said non-buoyant media.

18. A filter system as recited in claim 17, wherein:
(a) said pre-filter backwash system during backwashing directs influent through said pre-filter at a velocity less than the minimum fluidization velocity of said non-buoyant media.

19. A filter system as recited in claim 18, wherein:
(a) said non-buoyant media has an effective size greater than 1 millimeter.

20. A filter system for filtering water or wastewater, comprising:
(a) a polishing filter for filtering pre-treated influent, said polishing filter having a footprint equal to the square footage of floor space occupied by said polishing filter, said polishing filter including a reservoir housing for containing fluid, said reservoir housing having a plurality of filter cells for filtering pre-treated influent passed through said reservoir housing, each of said plurality of filter cells having at least one layer of media;
(b) a moveable polishing backwash assembly for sequentially backwashing said plurality of filter cells of said polishing filter;
(c) a pre-treatment filter for pre-treating influent, said pre-treatment filter has only one filter bed that is not sub-divided into filter cells for removing at least some of the impurities in the influent, said pre-treatment filter having an inlet for receiving untreated influent and an outlet for directing influent pre-treated by said pre-treatment filter to said polishing filter, said pre-treatment treatment filter having a footprint equal to the square footage of floor space occupied by said pre-treatment filter; and,
(d) said footprint of said pre-treatment filter being substantially less than said footprint of said polishing filter.

21. A method of backwashing a filter system that is used to filter water or wastewater, said method comprising the steps of:
(a) providing a pre-filter for pre-treating influent, the pre-filter having a single compartment for flocculating and filtering influent passing through the pre-filter, the single compartment having a particulate media formed therein;
(b) providing a polishing filter for filtering influent pre-treated by the pre-filter, the polishing filter includes a reservoir housing having a plurality of filter cells for filtering influent passed through the reservoir housing, each of the plurality of cells having at least one layer of media;
(c) providing a first backwash assembly for backwashing the pre-filter;
(d) providing a second backwash assembly for backwashing only the polishing filter;
(e) backwashing the pre-filter such that all of the media in the single compartment is backwashed at the same time; and,
(f) sequentially backwashing each cell of the polishing filter such that only media in one of the plurality of filter cells is backwashed at a given time.

22. A method as recited in claim 21, further including the step of:
(a) fluidizing the media in the pre-filter during backwashing.

23. A method of backwashing a filter system that is used to filter water or wastewater, said method comprising the steps of:
(a) providing first and second pre-treatment filters for pre-treating influent;
(b) providing a polishing filter for filtering influent pre-treated by the first and second pre-tratment filters, the polishing filter includes a reservoir housing having a plurality of filter cells for filtering influent passed through the reservoir housing, each of the plurality of filter cells having at least one layer of media;
(c) providing a first backwash assembly for backwashing the first pre-treatment filter;
(d) providing a second backwash assembly for backwashing the second pre-treatment filter;
(e) providing a third backwash assembly for backwashing the polishing filter, said third backwash assembly being separate and independent from said first backwash assembly and said second backwash assembly so that said third backwash assembly only cleans the polishing filter;
(f) backwashing the first pre-treatment filter while the second pre-treatment filter is pre-treating influent;
(g) directing influent pre-treated by the second pre-treatment filter to the polishing filter while the first pre-treatment filter is being backwashed; and,
(h) backwashing one cell of the plurality of cells of the polishing filter while at least one other cell of the polishing filter is filtering the pretreated influent generated from the second pre-treatment upflew filter.

24. A filtering system for filtering water or wastewater, comprising:
(a) a pre-filter for pre-treating influent, said pre-filter having at least one layer of media for removing impurities from the influent;
(b) a first polishing filter having a plurality of filter cells;
(c) a second polishing filter having a plurality of filter cells;
(d) a liquid conveyance member operably associated with said pre-filter, said first polishing filter and said second polishing filter such that influent treated by said pre-filter can pass to said first polishing filter and said second polishing filter; and,
(e) at least a portion of said liquid conveyance member being disposed between said first polishing filter and said second polishing filter.

25. A filtering system as set forth in claim 24, further including:
(a) a first moveable backwash assembly for sequentially backwashing said plurality of filter cells in said first polishing filter; and,
(b) a second moveable backwash assembly for sequentially backwashing said plurality of filter cells in said second polishing filter, said second moveable backwash assembly being separate and independent from said first moveable backwash assembly.

* * * * *

UNITED STATES PATENT AND TRADEMARK OFFICE
CERTIFICATE OF CORRECTION

PATENT NO. : 6,998,046 B2
DATED : February 14, 2006
INVENTOR(S) : R. Lee Roberts and Mark Kevin Addison It is certified that error appears in the above-identified patent and that said Letters Patent is hereby corrected as shown below:

Column 5,
Line 62, "pretreatment" should be -- pre-treatment --.

Column 7,
Line 63, "$(d)^{1\ 82}(sg-1)^{0\ 941}\ \rho^{1\ 88}\mu^{-0\ 88}$" should be
-- $(d)^{1.\ 82}(sg-1)^{0.\ 941}\ \rho^{1.\ 88}\mu^{-0.\ 88}$ --.

Column 10,
Lines 58 and 59, "Piping and at least a portion of said effluent Piping" should be
-- piping and at least a portion of said effluent piping --.

Column 12,
Line 9, "pre-tratment" should be -- pre-treatment --.
Line 32, "pre-treatment upflew filter" should be -- pre-treatment filter --.

Signed and Sealed this

Thirtieth Day of May, 2006

JON W. DUDAS
*Director of the United States Patent and Trademark Office*